United States Patent
Pichot et al.

(10) Patent No.: US 7,270,880 B2
(45) Date of Patent: Sep. 18, 2007

(54) ELECTROCHROMIC PARTICLES

(75) Inventors: Francois Pichot, Dublin (IE); Udo Bach, Hilzingen (DE); Nigel Leyland, Dublin (IE); Donald Lupo, Co. Roscommon (IE); David Corr, Dublin (IE); S. Nagaraja Rao, Dublin (IE)

(73) Assignee: NTERA Limited, Dublin (IE)

( * ) Notice: Subject to any disclaimer, the term of this patent is extended or adjusted under 35 U.S.C. 154(b) by 0 days.

(21) Appl. No.: 10/543,499

(22) PCT Filed: Jan. 30, 2004

(86) PCT No.: PCT/IE2004/000013

§ 371 (c)(1), (2), (4) Date: Nov. 2, 2005

(87) PCT Pub. No.: WO2004/067672

PCT Pub. Date: Aug. 12, 2004

(65) Prior Publication Data

US 2006/0097233 A1    May 11, 2006

(30) Foreign Application Priority Data

Jan. 31, 2003 (EP) .................. 03394010

(51) Int. Cl.
 *B32B 6/16* (2006.01)
(52) U.S. Cl. .............. 428/403; 428/404; 428/405; 428/406; 428/407; 427/375; 427/376.1; 427/376.2
(58) Field of Classification Search ........... 428/403, 428/404, 405, 406, 407; 427/375, 376.1, 427/376.2
See application file for complete search history.

(56) References Cited

U.S. PATENT DOCUMENTS 5,500,759 A * 3/1996 Coleman .................. 359/270

FOREIGN PATENT DOCUMENTS

| EP | 1 207 572 A1 | 5/2002 |
| EP | 1 244 168 A1 | 9/2002 |
| EP | 1 271 227 A1 | 1/2003 |
| WO | 98/35267 A1 | 8/1998 |
| WO | 01/27690 A2 | 4/2001 |

OTHER PUBLICATIONS

XP-002239106: Bonhôte, P., et al., "Nanocrystalline Electrochromic Displays", *Displays*, vol. 20, No. 3, pp. 137-144, (1999).
XP-004157010: Cinnsealach, R., et al., "Coloured Electrochromic Windows Based On Nanostructured $TiO_2$ Films Modified By Adsorbed Redox Chromophores" *Solar Energy Materials & Solar Cells*, vol. 57, No. 2, pp. 107-125, (1999).
XP-004154415: Campus, F., et al., "Electrochromic Devices Based On Surface-modified Nanocrystalline $TiO_2$ Thin-film Electrodes", *Solar Energy Materials & Solar Cells*, vol. 56, No. 3-4, pp. 281-297, (1999).

* cited by examiner

*Primary Examiner*—Leszek Kiliman
(74) *Attorney, Agent, or Firm*—Morgan, Lewis & Bockius LLP

(57) ABSTRACT

The invention concerns discrete electrochromic particles comprising conducting, semiconducting or insulating nanoparticles having one or more electrochromic compounds adsorbed on the surface thereof. These particles may be deposited on an electrode in a single process step at a relatively low temperature, thereby allowing the use of heat-sensitive materials such as plastics as flexible substrates for the electrode.

31 Claims, 2 Drawing Sheets

ELECTROCHROMIC PARTICLES

This invention relates to electrochromic particles. In particular, it relates to electrochromic particles suitable for use in electrochromic devices.

Electrochromic devices comprising electrodes based on nanostructured conducting or semiconducting films having surface-adsorbed electrochromic compounds are known from inter alia WO-A-98/35267 and WO-A-01/27690. Such electrodes are prepared by applying the nanostructured conducting or semiconducting film to a conducting substrate and annealing at high temperatures, followed by chemisorption of the electrochromic compounds on the surface of the nanoparticles in the film. This is a time-consuming procedure and also limits the electrode substrate materials to high temperature-resistant materials such as glass or ceramics. It would be desirable to provide conducting, semiconducting or insulating nanoparticles having electrochromic compounds adsorbed on their surface before their application to a substrate, thereby avoiding the disadvantages of the prior art.

According to the present invention there are provided discrete electrochromic particles comprising conducting, semiconducting or insulating nanoparticles having one or more electrochromic compounds adsorbed on the surface thereof.

The invention also provides a process for the preparation of the electrochromic particles of the invention, electrodes comprising said particles and their use in the manufacture of electrodes for electrochromic devices. The electrodes of the invention may be rigid or flexible depending on the choice of substrate material.

As used herein, the term "electrochromic compounds" or "(electro)chromophores" is intended to refer to compounds which change colour on the application of an electrical potential thereto, but excluding polymers and inorganic compounds.

As used herein, the term "nanoparticles" is intended to refer to discrete and dispersible particles having an average particle size of up to 80 nm, preferably up to 50 nm, and more preferably up to 30 nm.

As used herein, the term "conducting nanoparticles" is intended to refer to nanoparticles having no electronic bandgap; the term "semiconducting nanoparticles" is intended to refer to nanoparticles having a bandgap less than or equal to 5 electron Volts; and the term "insulating nanoparticles" is intended to refer to nanoparticles having a bandgap greater than 5 electron Volts.

The electrochromic particles of the invention may be in the form of a solid or suspended in a solvent.

The electrochromic compound(s) is/are preferably adsorbed on the surface of the nanoparticles so that there is up to 100% monolayer coverage of the nanoparticles and at least 1% monolayer coverage.

Conducting or semiconducting nanoparticles are preferred. Preferred nanoparticles are selected from doped or undoped oxides of the following metals: titanium, zirconium, hafnium, chromium, molybdenum, indium, tin, tungsten, vanadium, niobium, tantalum, silver, zinc, cerium, strontium, iron (2+ and 3+) or nickel, or a perovskite thereof, preferably $TiO_2$, $WO_3$, $SnO_2$, $MoO_3$, $In_2O_3/SnO_2$ or $ZnO$. Suitable dopants include F, Cl, Sb, P, As, B, Al, In, Ga, Si, Sn, Ti, Ge, Zr, Li and Hf.

Insulating nanoparticles which can be used in the present invention include oxides of silicon, aluminium, zirconium, barium, magnesium and sodium.

The electrochromic compounds adsorbed on the surface of the nanoparticles may be the same or different and are conveniently of the n-type or p-type. Preferred electrochromic compounds for use in this invention are disclosed in WO-A-98/35267, WO-A-01/27690, WO-A-03/001288 and a copending PCT Patent Application entitled "Electrochromic Compounds", filed on even date by the Applicant (NTera Limited). Particularly preferred n-type compounds include bis-(2-phosphonoethyl)-4,4'-bipyridinium dichloride, 1-phosphonoethyl-1'-(2,4,6-trimethylphenyl)-4,4'-bipyridinium dibisimide and 1-phosphonoethyl-1'-(4-styryl)-4,4'-bipyridinium diperchlorate.

Particularly preferred p-type compounds include: β-(10-phenothiazyl) propoxy phosphonic acid; β-(10-phenothiazyl) propyl-phosphonic acid; β-(10-phenothiazyl) propionate phosphonic acid; β-(10-phenoxazyl) propionate phosphonic acid; and (1-ferrocenyl) imido-benzylmethyl phosphonic acid.

The electrochromic compounds used in the present invention may also include reactive groups that can be activated to form a chemical bond between adjacent electrochromic compounds on the same particle or on adjacent electrochromic particles, hereinafter referred to as crosslinking groups. These groups are conveniently positioned on the electrochromic molecules at the opposite end of the surface attachment group. Alternatively, the crosslinking groups may be attached to the nanoparticles via, for example, an alkyl group which in turn is linked to a nanoparticle surface attachment group. Because each particle may contain many of these reactive groups on its exterior surface, the activation of these groups leads to a three-dimensional crosslinking of the particles. The activation may be initiated by thermal, ionic, reductive, oxidative, radical, photochemical or electrochemical means. Suitable reactive groups include vinyl, styryl, (meth)acrylates, epoxies, silanes, amines, alcohols, carboxylic acids and carboxylic acid halides. In some cases, activation may occur by reaction with an additional chemical entity, e.g. a bridging molecule such as a di-carboxylic acid, di-amine or di-alcohol.

The following table illustrates the above:

Crosslinking Schemes

| Crosslinking Group | Code | General formula | Activation schemes |
|---|---|---|---|
| Vinyl | R1 | | A1, A2, A3, A3 + A4, A5. |
| Styryl | R2 | | A1, A2, A3, A3 + A4, A5. |
| Acrylate | R3 | | A1, A2, A3, A3 + A4, A5. |
| Epoxy | R4 | | A7, A8. |
| Alcohol | R5 | | A6 + A1. |
| Amine | R6 | | A6 + A1. |

-continued

| Crosslinking Group | Code | General formula | Activation schemes |
|---|---|---|---|
| Carboxylic acid | R7 |  | A7 + A1, A8 + A1. |

Activation Schemes

| Activator | Code | Formula (where applicable) |
|---|---|---|
| Heat | A1 | |
| Ionic | A2 | Examples: Butyl lithium, Aluminium trichloride. |
| Light | A3 | Typically, UV light. |
| Photoinitiator | A4 | Example: azobisisobutyronitrile (AIBN) |
| Electrochemical reduction or oxidation | A5 | |
| Di-carboxylic acid | A6 | HO-C(=O)-CH2-CH2-C(=O)-OH |
| Di-alcohol | A7 | HO-CH2-CH2-OH |
| Di-amine | A8 | H2N-CH2-CH2-NH2 |

The crosslinking group is attached to the chromophore moiety via the bond depicted in bold. This crosslinking group can be activated via different schemes, some of which require the addition of initiators (i.e. A2, A4, A6, A7, A8) which will be included in the formulation to be printed, some of which require only heat or light as an initiator. The preferred schemes involve an activation process step after printing. This allows better control of when the printed film can be crosslinked. The preferred methods therefore include exposure to heat, light or an electrochemical potential (A1, A3 and A5), that may or may not be facilitated by the presence of additional chemical initiators in the formulation and film.

Crosslinking of the electrochromic particles enhances the mechanical strength of the resulting film. Crosslinking dispenses with the need for a polymeric binder and renders the electrochromic particles particularly suitable for ink-jet printing.

The electrochromic particles of the present invention may additionally comprise on the surface of the nanoparticles one or more compounds which prevent or inhibit aggregation of the electrochromic compounds adsorbed on the nanoparticles. Suitable aggregation-inhibiting compounds include alkane phosphonates and cationic pyridinium carrying one or more anchoring functional groups, such as phosphonoethylpyridinium perchlorate.

The electrochromic particles of the invention may be prepared by mixing the conducting, semiconducting or insulating nanoparticles and one or more electrochromic compounds in a solvent and optionally isolating the resulting electrochromic particles.

The nanoparticles may be suspended in a solvent prior to mixing with the electrochromic compound(s) in a solvent. In the latter event, the nanoparticle solvent and the electrochromic compound solvent are preferably the same. The mixing is typically carried out at a temperature of approximately 25° C. for a period of from approximately 30 minutes to 2 hours. The resulting electrochromic particles may be isolated by any suitable means, such as, for example, by centrifugation, and dried at a temperature in the range of from approximately 50° C. to 90° C. for approximately 6 to 30 hours.

Solvents suitable for suspending the nanoparticles and electrochromic compounds, and dispersing the dried electrochromic particles include diethyl ether, 1,1,1-trichloroethane, amyl acetate, carbon tetrachloride, xylene, ethyl acetate, toluene, tetrahydrofuran, N-methylpyrrolidone, benzene, chloroform, trichloroethylene, methyl ethyl ketone, acetone, diacetone alcohol, ethylene dichloride, methylene chloride, pyridine, morpholine, dimethylformamide, dimethyl sulphoxide, methanol, ethanol, n-propanol, n-butanol, propylene glycol, ethylene glycol, glycerol, and water. Preferred solvents include ethanol, N-methylpyrrolidone and water.

To form an electrode, the dried electrochromic particles may be dispersed in a solvent, such as N-methylpyrrolidone or polyvinyl difluoride, so as to form a paste which is then applied to a suitable substrate by, for example, stencil-coating or ink-jet printing or screen-printing. The paste on the substrate may be dried at a temperature in the range of from about 50° C. to 200° C., preferably about 80° C. to 150° C. The substrate may be formed from e.g. glass, ceramic, metal or plastic, optionally coated with a layer of conducting material, such as tin oxide doped with fluorine or antimony.

In cases where one or more of the electrochromic compounds present on the electrochromic particles, include one or more crosslinking groups, a crosslinking initiator may be added to the dispersion of dried electrochromic particles.

An electrochromic device may be formed by preparing a counter electrode, sealing the counter electrode to the electrode comprising the electrochromic particles of the invention and incorporating an ion-conducting medium.

The electrochromic particles of the invention have the following advantages:

1. They may be deposited on an electrode in a single process step at a relatively low temperature, thereby allowing the use of heat-sensitive materials such as plastics as flexible substrates for the electrode;

2. They allow greater control of the pixel size and resolution of the final image, especially where small pixel size and more than one coloured pixel are required on the same electrode or image;

3. The colour of the electrochromic particles can be controlled by changing the nature and relative amounts of the chromophores. For example, (i) electrochromic particles with different chromophores can be mixed homogeneously and the resulting film will display the corresponding mixed colour, and (ii) different electrochromic particles with different chromophores can be deposited side by side on a substrate thereby providing the possibility of increasing the information content of the display. Such pixels composed of electrochromic particles can be independently addressed, so that a high resolution multicolour (polychromic) display device can be achieved.

The invention is illustrated in the following Examples.

EXAMPLE 1

Electrochromic particles were prepared by dissolving 0.1M bis-(2-phosphonoethyl)-4,4'-bipyridinium dichloride (1.118 g) as the chromophore and 0.01M lithium perchlorate (0.0266 g) in 25 ml of water. 5 g of $TiO_2$ powder (30 nm average particle size) were added to the chromophore solution. The mixture was stirred at 25° C. for 1 hour and subsequently centrifuged at 5000 rpm to separate the electrochromic particles. The electrochromic particles were redispersed in ethanol to dissolve any non-chemisorbed chromophore molecules and separated again by centrifugation at 5000 rpm from the rinse solution. The washed solids were subsequently dried at 70° C. for 24 hours.

For the preparation of a cathode, 4 g of the dried electrochromic particles were dispersed in 6 g of N-methyl pyrrolidone to form a paste. This paste was stencil-coated on to a fluorine-doped tin oxide (FTO) glass substrate which was dried using the following thermal cycle immediately after printing of the paste:

From room temperature (25° C.) to approximately 100° C. over a 15 minute period; At 100° C. for 30 minutes; Cool down to room temperature (25° C.) over a period of 30 minutes.

The resulting cathode was then rinsed in ethanol to remove any non-chemisorbed chromophore molecules.

EXAMPLE 2

Electrochromic particles were prepared by dissolving 500 mg of mesidine bisimide (i.e. 1-phosphonoethyl-1'-(2,4,6, trimethylphenyl)-4,4'-bipyridinium dibisimide) in 100 ml of methanol and adding this solution over a period of 20 minutes to 200 ml of methanol containing 2.5 g of suspended $TiO_2$ nanoparticles. Mesidine bisimide is an electrochromic compound which is disclosed and claimed in a copending European Patent Application entitled "Electrochromic Compounds", filed on even date by the Applicant (NTera Limited). When the addition was complete, the mixture was stirred at 25° C. for 1 hour and subsequently centrifuged at 5000 rpm to separate the electrochromic particles. The electrochromic particles were redispersed in ethanol to dissolve any non-chemisorbed chromophore molecules and separated again by centrifugation at 5000 rpm from the rinse solution. The washed solids were subsequently dried at 70° C. for 24 hours.

For the preparation of a cathode, 4 g of the dried electrochromic particles were dispersed in 6 g of N-methyl pyrrolidone to form a paste. The paste was stencil-coated onto a fluorine doped tin oxide (FTO) glass substrate which was dried using the following thermal cycle immediately after printing of the paste:

From room temperature (25° C.) to 60° C. over 15 minutes; At 60° C. for 30 minutes; Cool down to room temperature (25° C.) over a period of 30 minutes.

The resulting cathode was then rinsed in ethanol to remove any non-chemisorbed chromophore molecules.

EXAMPLE 3

Electrochromic particles were prepared by dissolving 500 mg of 1-phosphonoethyl-1'-(4-styryl)-4,4'-bipyridinium diperchlorate in 200 ml of methanol containing 2.5 g of suspended $TiO_2$ nanoparticles. 1-Phosphonoethyl-1'-(4-styryl)-4,4'-bipyridinium diperchlorate is disclosed in WO-A-03/001288. The mixture was stirred at 25° C. for 1 hour and subsequently centrifuged at 5000 rpm to separate the electrochromic particles. The electrochromic particles were redispersed in ethanol to dissolve any non-chemisorbed chromophore molecules and separated again by centrifugation at 5000 rpm from the rinse solution. The washed solids were subsequently dried at 70° C. for 24 hours.

For the preparation of a cathode, 4 g of the dried electrochromic particles were dispersed in 6 g of N-methyl pyrrolidone containing 300 mg azobisisobutyronitrile (AIBN) as photoinitiator to form a printing paste. The paste was stencil-coated onto an indium tin oxide (ITO) glass substrate. Immediately after coating, the substrate was dried, and the film was crosslinked at 80° C. for 60 minutes.

EXAMPLE 4

A cathode (40 mm×40 mm) was prepared according to the procedure of Example 1.

For the preparation of a counter electrode, a glass substrate coated with fluorine doped tin oxide (FTO) as transparent conducting oxide (50 mm×50 mm) was coated with antimony doped tin oxide (ATO) by screen-printing and heated at 60° C. for 20-30 minutes. A white reflector paste comprising white pigment particles of rutile titania was coated by screen-printing over the ATO layer and the double layer was allowed to sinter at 450° C. for 45 minutes.

The cathode was sealed to the counter electrode using an epoxy gasket seal. The resulting electrochromic device was backfilled with a 0.2M electrolyte solution of lithium perchlorate in gamma butyrolactone under vacuum and cured under UV light. Application of 1.3V across this electrochromic device resulted in colouration of the device.

Figure 1:
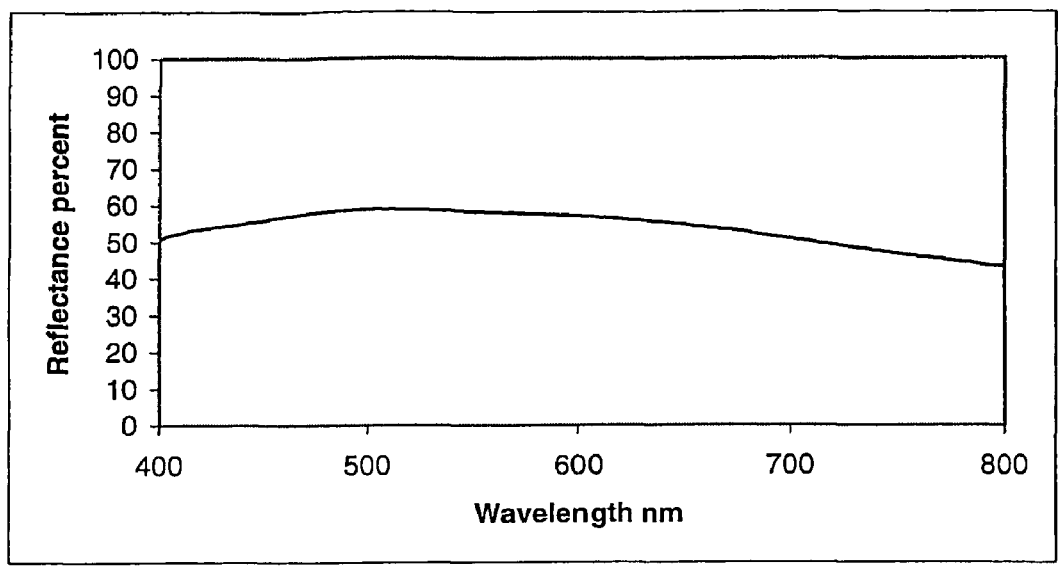
FIG. 1 shows the UV-visible reflectance spectra of the electrochromic particles prepared in Example 1.
Figure 2:
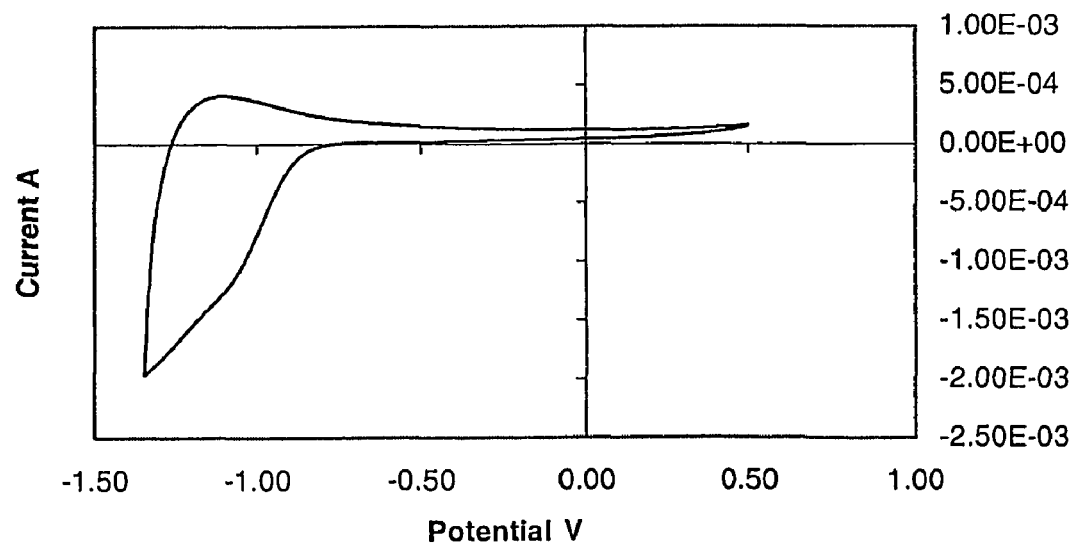
FIG. 2 is a cyclic voltammogram of the electrochromic device of Example 4, with a scan rate of 10 mV/sec. The onset voltage for device colouration is approximately −0.8 Volt, which is very advantageous in terms of device energy consumption.
Figure 3:
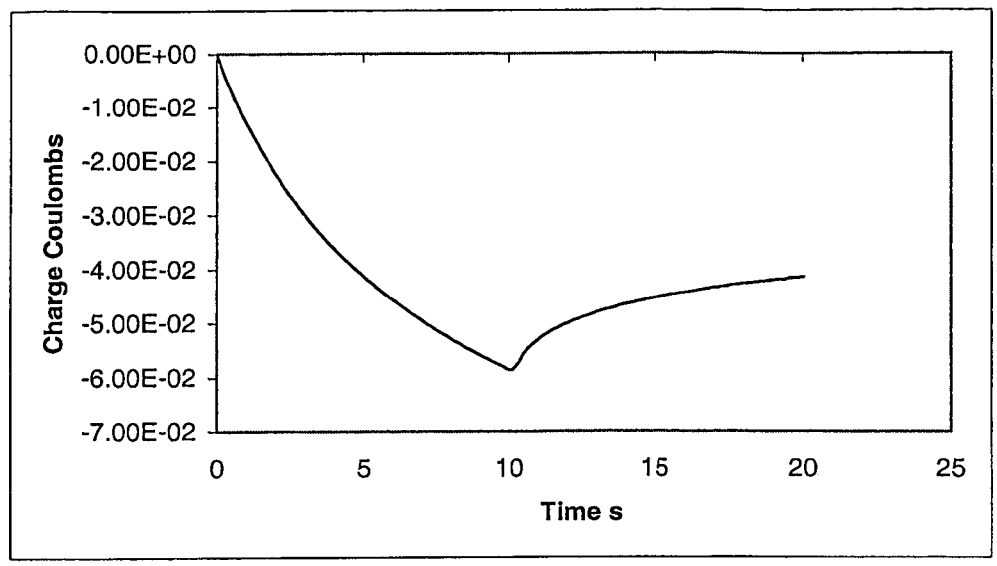
Figure 4:
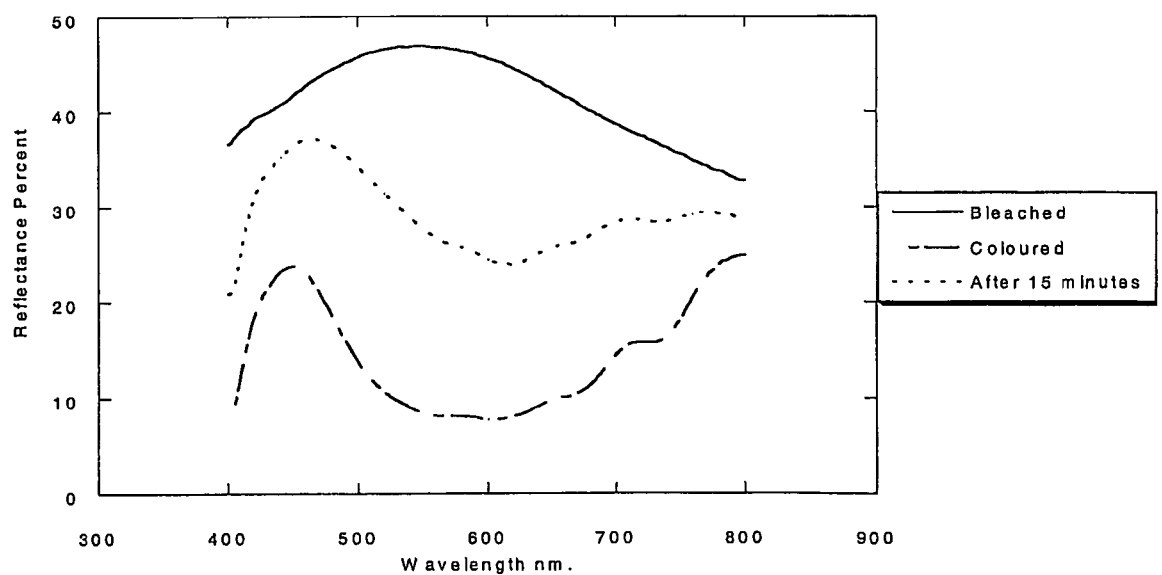

FIG. 3 shows the chronocoulometric behaviour (charge versus time) of the device of Example 4 when a −1.3 Volt pulse is applied to the device. The amount of charge corresponding to full colouration is approximately 4 $mC/cm^2$. Combined with the low onset voltage, this charge consumption yields a low power consumption for the device comprising these films; and FIG. 4 shows the reflectance of the device of Example 4 in the bleached state (short circuit, denoted by a solid line —) and coloured state (immediately after applying the colouration voltage (−1.3V) pulse, denoted by a dashed line ——-), and after 15 minutes held at open circuit, concurrently (denoted by a broken line ----). A reflectance as high as 45.62% is obtained in the bleached state and as low as 7.74% in the coloured state resulting in a contrast ratio of 5.89. These results compare very favourably with those obtained using devices of the type disclosed in WO-A-98/35267 and WO-A-01/27690.

The invention claimed is:

1. Discrete electrochromic particles comprising conducting, semiconducting or insulating nanoparticles, said nanoparticles having an average particle size of up to 80 nm and one or more electrochromic compounds adsorbed on the surface thereof.

2. Electrochromic particles according to claim 1, which are in the form of a solid or a suspension.

3. Electrochromic particles according to claim 1, wherein the nanoparticles have an average particle size of up to 50 nm.

4. Electrochromic particles according to claim 1, wherein the nanoparticles are conducting or semiconducting.

5. Electrochromic particles according to claim 1, wherein the nanoparticles are selected from doped or undoped oxides of the group of metals consisting of titanium, zirconium, hafnium, chromium, molybdenum, indium, tin, tungsten, vanadium, niobium, tantalum, silver, zinc, cerium, strontium, iron ($2^+$ and $3^+$), nickel, and a perovskite.

6. Electrochromic particles according to claim 5, wherein the metal oxides are doped by F, Cl, Sb, P, As, B, Al, In, Ga, Si, Sn, Ti, Ge, Zr, Li or Hf.

7. Electrochromic particles according to claim 1, wherein the electrochromic compounds are of the n-type or p-type.

8. Electrochromic particles according to claim 7, wherein the electrochromic compounds are of the n-type and are selected from bis-(2-phosphonoethyl)-4,4'-bipyridinium dichioride, 1-phosphonoethyl-1'-(2,4,6-trimethylphenyl)-4, 4'-bipyridinium dibisimide and 1-phosphonoethyl-1'-(4-styryl)-4,4'-bipyridinium diperchlorate.

9. Electrochromic particles according to claim 7, wherein the electrochromic compounds are of the p-type and are selected from .beta.-(10-phenothiazyl)propoxy phosphonic acid; .beta.-(10-phenothiazyl)propyl-phosphonic acid; .beta.-(10-phenothiazyl)propionate phosphonic acid; .beta.-(10-phenoxazyl)propionate phosphonic acid; and (1-ferrocenyl)imido-benzylmethyl phosphonic acid.

10. Electrochromic particles according to claim 1, wherein the or each electrochromic compound includes one or more crosslinking groups.

11. Electrochromic particles according to claim 10, wherein the crosslinking groups are selected from the group consisting of vinyl, styryl, (meth)acrylates, epoxies, silanes, amines, alcohols, carboxylic acids and carboxylic acid halides.

12. Electrochromic particles according to claim 1, wherein the nanoparticles additionally comprise on their surface one or more compounds which prevent or inhibit aggregation of the electrochromic compounds adsorbed on the nanoparticles.

13. Electrochromic particles according to claim 12, wherein the aggregation-inhibiting compounds are selected from alkane phosphonates and cationic pyridinium carrying one or more anchoring functional groups.

14. A process for preparing discreet electrochromic particles comprising conducting, semiconducting or insulating nanoparticles having one or more electrochromic compounds adsorbed on the surface thereof comprising:

providing conducting. semiconducting or insulating nanoparticles having an average particle size of up to 80 nm, mixing the conducting, semiconducting or insulating nanoparticles and one or more electrochromic compounds in a solvent, and optionally isolating the resulting electrochromic particles.

15. A process according to claim 14, wherein the nanoparticles are isolated and suspended in a solvent prior to mixing with the electrochromic compound(s) in a solvent.

16. A process according to claim 15, wherein the solvents used to suspend the nanoparticles and dissolve the electrochromic compound(s) are the same.

17. A process according to claim 14, wherein the solvent is ethanol, N-methyl pyrrolidone or water.

18. A process according to claim 14 further comprising drying the isolated electrochromic particles.

19. A process according to claim 18 further comprising dispersing the dried electrochromic particles in a solvent so as to form a paste and applying said paste to a substrate, so as to form a first electrode.

20. A process according to claim 19, further comprising drying said paste on the substrate at a temperature in the range of from about 50° C. to about 200° C.

21. A process according to claim 19, wherein the paste is applied by stencil-coating or ink-jet printing or screen-printing.

22. A process according to claim 19, wherein the substrate is formed from glass, ceramic, metal or plastic optionally coated with a layer of conducting material, such as tin oxide doped with fluorine or antimony.

23. A process according to claim 19, wherein one or more electrochromic compounds on the electrochromic particles include one or more crosslinking groups and the paste also comprises a crosslinking initiator.

24. A process according to claim 19, further comprising preparing a counter electrode, sealing the counter electrode to the first electrode and incorporating an ion-conducting medium, so as to form an electrochromic device.

25. An electrode or an electrochromic device comprising electrochromic particles according to claim 1.

26. Use of electrochromic particles according to claim 1 in the manufacture of an electrode or an electrochromic device.

27. Electrochromic particles according to claim 1, wherein the nanoparticles have an average particle size of up to 30 nm.

28. Electrochromic particles according to claim 1, wherein the nanoparticles are selected from the group consisting of $TiO_2$, $WO_3$, $SnO_2$, $MoO_3$, $In_2O_3/SnO_2$ and ZnO.

29. A process according to claim 14, wherein said nanoparticles have an average particle size of up to 50 nm.

30. A process according to claim 14, wherein said nanoparticles have an average particle size of up to 30 nm.

31. A process according to claim 19, further comprising drying said paste on the substrate at a temperature in the range of from about 80° C. to 150° C.

* * * * *